(12) United States Patent
Simanovsky et al.

(10) Patent No.: US 10,459,094 B2
(45) Date of Patent: Oct. 29, 2019

(54) DETECTOR ARRAY FOR IMAGING MODALITY

(71) Applicant: Analogic Corporation, Peabody, MA (US)

(72) Inventors: Sergey Simanovsky, Brookline, MA (US); Andrew Litvin, Stoneham, MA (US); Daniel Abenaim, Lynnfield, MA (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 15/307,938

(22) PCT Filed: Apr. 30, 2014

(86) PCT No.: PCT/US2014/035980
§ 371 (c)(1),
(2) Date: Oct. 31, 2016

(87) PCT Pub. No.: WO2015/167481
PCT Pub. Date: Nov. 5, 2015

(65) Prior Publication Data
US 2017/0059721 A1 Mar. 2, 2017

(51) Int. Cl.
*G01T 1/29* (2006.01)
*G01T 1/20* (2006.01)
*G01T 1/24* (2006.01)

(52) U.S. Cl.
CPC .......... *G01T 1/2985* (2013.01); *G01T 1/2018* (2013.01); *G01T 1/243* (2013.01)

(58) Field of Classification Search
CPC ...... G01T 1/2985; G01T 1/2018; G01T 1/243
See application file for complete search history.

(56) References Cited

U.S. PATENT DOCUMENTS

| 4,467,342 A | * | 8/1984 | Tower | ................. H01L 25/0655 257/222 |
| 4,731,534 A | * | 3/1988 | Klein | .................... G01T 1/1644 250/366 |

(Continued)

FOREIGN PATENT DOCUMENTS

| EP | 1063538 A2 | 12/2000 |
| GB | 2332608 A | 6/1999 |

OTHER PUBLICATIONS

International Search Report cited in related application No. PCT/US14/35980 dated Jan. 12, 2015, pp. 14.

(Continued)

*Primary Examiner* — David P Porta
*Assistant Examiner* — Djura Malevic
(74) *Attorney, Agent, or Firm* — TraskBritt

(57) ABSTRACT

A detector array such as for use in a radiation imaging modality is provided. The detector array includes a first pixel (302*a*) having a first scintillator (402). The first scintillator has a first detection surface (408) and a first light emission surface (412). The first detection surface extends along a first detection surface plane and the first light emission surface extends along a first light emission surface plane. The detector array includes a second pixel (302*b*) having a second scintillator (420). The second scintillator has a second detection surface (426) and a second light emission surface (430). The second detection surface extends along a second detection surface plane and the second light emission surface extends along a second light emission surface plane. At least one of the first detection surface plane is not coplanar with the second detection surface plane or the first light emission surface plane is not coplanar with the second light emission surface plane.

20 Claims, 11 Drawing Sheets

(56) References Cited

U.S. PATENT DOCUMENTS

| | | | | |
|---|---|---|---|---|
| 4,872,188 A * | 10/1989 | Lauro | ............... | H04N 5/3205 348/E5.089 |
| 5,420,429 A * | 5/1995 | Eberhard | ............... | B06B 1/064 250/367 |
| 5,572,037 A * | 11/1996 | Liu | ............... | G01N 23/043 250/363.02 |
| 5,834,782 A * | 11/1998 | Schick | ............... | H04N 5/2254 250/370.11 |
| 5,847,398 A * | 12/1998 | Shahar | ............... | G01T 1/1648 250/370.09 |
| 6,069,361 A * | 5/2000 | Rubinstein | ............... | G01T 1/2018 250/366 |
| 6,175,611 B1 * | 1/2001 | Melen | ............... | G01T 1/243 250/332 |
| 6,207,944 B1 * | 3/2001 | Spartiotis | ............... | H01L 27/14601 250/208.1 |
| 6,403,964 B1 * | 6/2002 | Kyyhkynen | ............... | G01T 1/243 250/366 |
| 6,408,110 B2 * | 6/2002 | Schulman | ............... | H01L 27/14601 382/312 |
| 6,570,613 B1 * | 5/2003 | Howell | ............... | H04N 3/1587 348/218.1 |
| 7,081,627 B2 * | 7/2006 | Heismann | ............... | G01T 1/2018 250/370.09 |
| 7,247,858 B2 * | 7/2007 | De Keyser | ............... | A61B 6/00 250/370.01 |
| 7,283,608 B2 * | 10/2007 | Hoffman | ............... | G01T 1/2018 378/19 |
| 7,435,965 B2 * | 10/2008 | Fuchs | ............... | G01T 1/2018 250/367 |
| 7,696,481 B2 * | 4/2010 | Tkaczyk | ............... | G01T 1/2985 250/363.02 |
| 9,780,128 B2 * | 10/2017 | Tajima | ............... | H01L 27/14603 |
| 9,793,305 B2 * | 10/2017 | Tajima | ............... | H01L 27/14603 |
| 2003/0200655 A1 * | 10/2003 | Vafi | ............... | H01L 27/14658 29/854 |
| 2004/0200971 A1 * | 10/2004 | De Keyser | ............... | A61B 6/00 250/370.09 |
| 2005/0082491 A1 * | 4/2005 | Seppi | ............... | A61B 6/032 250/370.11 |
| 2009/0224162 A1 * | 9/2009 | Inuiya | ............... | G01T 1/244 250/370.09 |
| 2009/0290680 A1 * | 11/2009 | Tumer | ............... | G01T 1/247 378/62 |
| 2010/0135463 A1 | 6/2010 | Kang et al. | | |
| 2012/0250822 A1 * | 10/2012 | Helm | ............... | A61B 6/4208 378/62 |
| 2014/0054466 A1 * | 2/2014 | Kurokawa | ............... | A61B 6/4208 250/362 |
| 2014/0138553 A1 * | 5/2014 | Ogawa | ............... | A61B 6/14 250/393 |

OTHER PUBLICATIONS

Office Action received for European Patent Application No. 14728378, dated Feb. 27, 2019, 3 pages.

Chinese Office Action cited in Chinese Application No. 201480078631.3 dated May 28, 2018, 17 pgs.

Chinese Office Action dated Jan. 28, 2019 for CN Application No. 201480078631, 17 pages with English translation.

* cited by examiner

US 10,459,094 B2

DETECTOR ARRAY FOR IMAGING MODALITY

CROSS-REFERENCE TO RELATED APPLICATIONS

This application is a national phase entry under 35 U.S.C. § 371 of International Patent Application PCT/US2014/035980, filed Apr. 30, 2014, designating the United States of America and published in English as International Patent Publication WO 2015/167481 A1 on Nov. 5, 2015.

TECHNICAL FIELD

The present application relates to a radiation detector array with pixels having varying thicknesses or defining a non-planar surface. It finds particular application in the field of computed tomography (CT) imaging utilized in medical, security, and/or industrial applications, for example. However, it also relates to other radiation modalities where a detector array is used.

BACKGROUND

Today, CT and other imaging modalities (e.g., mammography, digital radiography, etc.) are useful to provide information, or images, of interior aspects of an object under examination. Generally, the object is exposed to radiation (e.g., X-rays, gamma rays, etc.), and an image(s) is formed based upon the radiation absorbed and/or attenuated by the interior aspects of the object, or rather an amount of radiation photons that is able to pass through the object. Typically, highly dense aspects of the object (or aspects of the object having a composition comprised of higher atomic number elements in the case of dual-energy) absorb and/or attenuate more radiation than less dense aspects, and thus an aspect having a higher density (and/or high atomic number elements), such as a bone or metal, for example, will be apparent when surrounded by less dense aspects, such as muscle or clothing.

Radiation imaging modalities generally comprise, among other things, one or more radiation sources (e.g., an X-ray source, Gamma-ray source, etc.) and a detector array comprised of a plurality of pixels that are respectively configured to convert radiation that has traversed the object into signals that may be processed to produce the image(s). As an object is passed through an examination region defined between the radiation source(s) and the detector array, radiation is absorbed/attenuated by the object, causing changes in the amount/energy of radiation detected by the detector array.

It is desired to detect most, if not all, of the radiation that passes through the object (e.g., to produce a higher fidelity image). However, only a portion of the X-ray dose passing through the object is detected or measured by the detector array due to the presence of cross-talk inhibiting reflective material located between adjacent scintillators of the detector array, where radiation that impinges upon the reflective material goes undetected or unmeasured. It is not uncommon for 25% to 35% of the radiation that passes through the object to impinge upon the reflective material (e.g., instead of the active/scintillator material) and thus go undetected.

Moreover, in some applications (e.g., security) it is also beneficial to obtain an effective atomic number ($Z_{eff}$) of objects scanned by a radiation system. $Z_{eff}$ is a material property that allows threat materials to be distinguished from benign materials (e.g., by providing a metric to differentiate objects having similar density characteristics). X-rays having more than one distinct X-ray spectra (e.g., corresponding to more than one distinct photon energy) are used to measure $Z_{eff}$ (e.g., where photons of different energies are attenuated differently by the same material to yield an indication of a characteristic of the material). While some detector arrays are configured to detect two distinct photon energies, such as detector arrays that implement photon counting technologies and/or sandwich technologies (e.g., that have multiple layers of scintillator materials), such detector arrays are generally costly and/or complex.

BRIEF SUMMARY

Aspects of the present application address the above matters, and others. According to one aspect, a detector array is provided for detecting radiation photons. The detector array comprises a first pixel comprising a first scintillator configured to convert a first radiation photon into first light energy. The first scintillator comprises a first detection surface through which the first radiation photon enters the first scintillator and a first light emission surface through which the first light energy exits the first scintillator. The first detection surface extends along a first detection surface plane and the first light emission surface extends along a first light emission surface plane. The detector array comprises a second pixel comprising a second scintillator configured to convert a second radiation photon into second light energy. The second scintillator comprises a second detection surface through which the second radiation photon enters the second scintillator and a second light emission surface through which the second light energy exits the second scintillator. The second detection surface extends along a second detection surface plane and the second light emission surface extends along a second light emission surface plane. At least one of the first detection surface plane is not coplanar with the second detection surface plane or the first light emission surface plane is not coplanar with the second light emission surface plane.

According to another aspect, a detector array for detecting radiation photons comprises a first scintillator configured to convert a first radiation photon into first light energy. The first scintillator comprises a first detection surface through which the first radiation photon enters the first scintillator and a first light emission surface through which the first light energy exits the first scintillator. The first light emission surface extends along a first light emission surface plane. The detector array comprises a second scintillator configured to convert a second radiation photon into second light energy. The second scintillator comprises a second detection surface through which the second radiation photon enters the second scintillator and a second light emission surface through which the second light energy exits the second scintillator. The second detection surface extends along a second detection surface plane. The first light emission surface plane does not intersect the second scintillator and the second detection surface plane does not intersect the first scintillator.

According to another aspect, a detector array for detecting radiation photons comprises a first scintillator configured to convert a first radiation photon into first light energy. The first scintillator comprises a first detection surface through which the first radiation photon enters the first scintillator and a first light emission surface through which the first light energy exits the first scintillator. The first scintillator has a first scintillator thickness between the first detection surface and the first light emission surface. The detector array comprises a second scintillator configured to convert a second radiation photon into second light energy. The second scintillator comprises a second detection surface through which the second radiation photon enters the second scintillator and a second light emission surface through which the second light energy exits the second scintillator. The second scintillator has a second scintillator thickness between the second detection surface and the second light emission surface. The second scintillator thickness is different than the first scintillator thickness.

According to another aspect, a detector array configured to detect radiation photons comprises a first pixel comprising a first direct conversion material configured to convert a first radiation photon into a first electrical charge. The first direct conversion material comprises a first detection surface through which the first radiation photon enters the first direct conversion material and a first emission surface through which the first electrical charge exits the first direct conversion material. The first detection surface extends along a first detection surface plane and the first emission surface extends along a first emission surface plane. The detector array also comprises a second pixel comprising a second direct conversion material configured to convert a second radiation photon into a second electrical charge. The second direct conversion material comprises a second detection surface through which the second radiation photon enters the second direct conversion material and a second emission surface through which the second electrical charge exits the second direct conversion material. The second detection surface extends along a second detection surface plane and the second emission surface extends along a second emission surface plane. At least one of the first detection surface plane is not coplanar with the second detection surface plane or the first emission surface plane is not coplanar with the second emission surface plane.

Those of ordinary skill in the art will appreciate still other aspects of the present application upon reading and understanding the appended description.

BRIEF DESCRIPTION OF THE DRAWINGS

The application is illustrated by way of example and not limitation in the figures of the accompanying drawings, in which like references generally indicate similar elements and in which.

DETAILED DESCRIPTION

Figure 1:
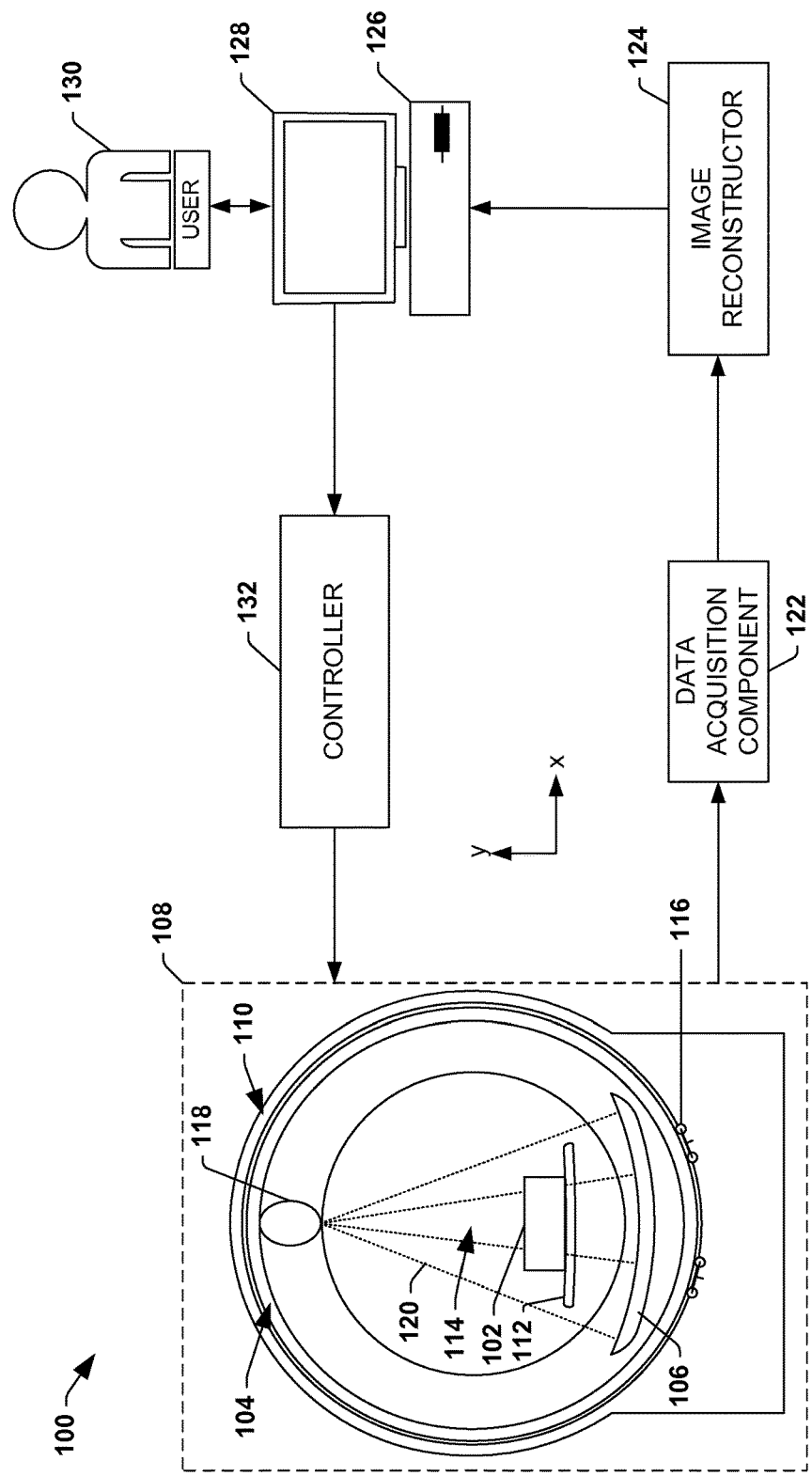
FIG. 1 illustrates an example environment of an imaging modality.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

FIG. 1 is an illustration of an example environment 100 comprising an example radiation imaging modality that may be configured to generate data (e.g., images) representative of an object 102 or aspect(s) thereof under examination. It will be appreciated that the features described herein may find applicability to other imaging modality besides the example computed tomography (CT) scanner illustrated in FIG. 1. For example, pixels may find applicability to other types of imaging modalities, such as line scanners and/or other systems comprising an indirect conversation detector array. Moreover, the arrangement of components and/or the types of components included in the example environment 100 are for illustrative purposes only. For example, as will be described in more detail below, at least a portion of a data acquisition component 122 may be comprised within pixels of a detector array 106.

In the example environment 100, an examination unit 108 of the imaging modality is configured to examine one or more objects 102. The examination unit 108 can comprise a rotating gantry 104 and a (stationary) support structure 110 (e.g., which may encase and/or surround as least a portion of the rotating gantry 104 (e.g., as illustrated with an outer, stationary ring, surrounding an outside edge of an inner, rotating ring)). During an examination of the object(s) 102, the object(s) 102 can be placed on a support article 112, such as a bed or conveyor belt, for example, that is selectively positioned in an examination region 114 (e.g., a hollow bore in the rotating gantry 104), and the rotating gantry 104 can be rotated and/or supported about the object(s) 102 by a rotator 116, such as a motor, drive shaft, chain, roller truck, etc.

The rotating gantry 104 may surround a portion of the examination region 114 and may comprise one or more radiation sources 118 (e.g., an ionizing X-ray source, gamma radiation source, etc.) and a detector array 106, comprised of a plurality of pixels (e.g., also referred to as detector cells), that is mounted on a substantially diametrically opposite side of the rotating gantry 104 relative to the radiation source(s) 118.

During an examination of the object(s) 102, the radiation source(s) 118 emits fan, cone, wedge, and/or other shaped radiation 120 configurations from a focal spot(s) of the radiation source(s) 118 (e.g., a point within the radiation source(s) 118 from which radiation 120 emanates) into the examination region 114. It will be appreciated that such radiation 120 may be emitted substantially continuously and/or may be emitted intermittently (e.g., a brief pulse of radiation is emitted followed by a resting period during which the radiation source 118 is not activated).

As the emitted radiation 120 traverses the object(s) 102, the radiation 120 may be attenuated differently by different aspects of the object(s) 102. Because different aspects attenuate different percentages of the radiation 120, an image(s) may be generated based upon the attenuation, or variations in the number of photons that are detected by the detector array 106. For example, more dense aspects of the object(s) 102, such as a bone or metal plate, may attenuate more of the radiation 120 (e.g., causing fewer photons to strike the detector array 106) than less dense aspects, such as skin or clothing.

The detector array 106 can comprise a linear (e.g., one-dimensional) or two-dimensional array of pixels disposed as a single row/column or multiple rows/columns. The pixels (and corresponding channels) may directly and/or indirectly convert detected radiation into analog signals. For example, respective pixels may comprise a direct conversion material configured to convert radiation energy directly into electrical energy. As another example, respective pixels may comprise a scintillator material configured to convert radiation energy into light energy and an array of photodetectors configured to convert the light energy into electrical energy.

Signals that are produced by the detector array 106 may be transmitted to a data acquisition component 122 that is in operable communication with the detector array 106 (e.g., and at least portions of which may be coupled to and/or comprised within at least some of the pixels of the detector array 106). Typically, the data acquisition component 122 is configured to convert the electrical signals output by respective pixels of the detector array into digital data and/or to combine the digital data acquired during a measuring interval. The collection of digital output signals for a measuring interval may be referred to as a "projection" or a "view." Moreover, an angular orientation of the rotating gantry 104 (e.g., and the corresponding angular orientations of the radiation source(s) 118 and the detector array 106) relative to the object(s) 102 and/or support article 112, for example, during generation of a projection may be referred to as the "projection angle."

The example environment 100 also illustrates an image reconstructor 124 that is operably coupled to the data acquisition component 122 and is configured to generate one or more images representative of the object 102 under examination based at least in part upon signals output from the data acquisition component 122 using suitable analytical, iterative, and/or other reconstruction technique (e.g., tomosynthesis reconstruction, back-projection, iterative reconstruction, etc.). Such images may be 3D images and/or 2D images.

The example environment 100 also includes a terminal 126, or workstation (e.g., a computer), configured to receive image(s) from the image reconstructor 124, which can be displayed on a monitor 128 to a user 130 (e.g., security personnel, medical personnel, etc.). In this way, the user 130 can inspect the image(s) to identify areas of interest within the object(s) 102. The terminal 126 can also be configured to receive user input which can direct operations of the examination unit 108 (e.g., a speed of gantry rotation, an energy level of the radiation, etc.).

In the example environment 100, a controller 132 is operably coupled to the terminal 126. In an example, the controller 132 is configured to receive user input from the terminal 126 and generate instructions for the examination unit 108 indicative of operations to be performed.

It will be appreciated that the example component diagram is merely intended to illustrate one embodiment of one type of imaging modality and is not intended to be interpreted in a limiting manner. For example, the functions of one or more components described herein may be separated into a plurality of components and/or the functions of two or more components described herein may be consolidated into merely a single component. Moreover, the imaging modality may comprise additional components to perform additional features, functions, etc. (e.g., such as automatic threat detection).

Figure 2:
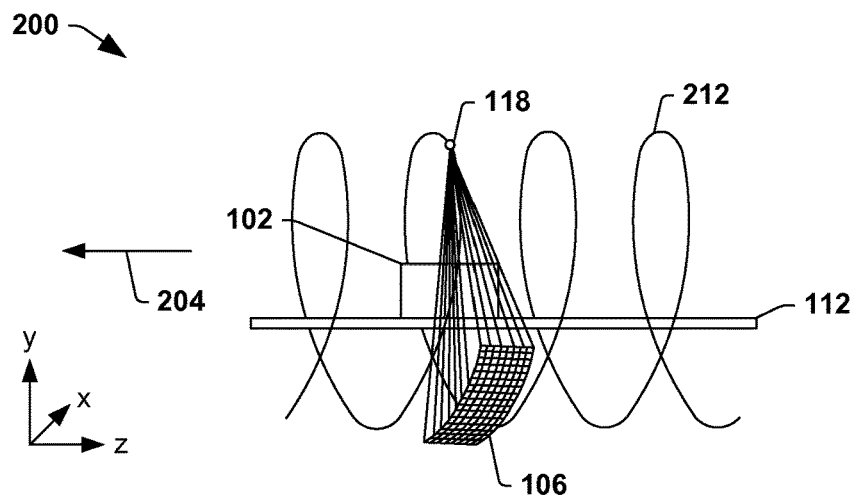
FIG. 2 illustrates a functional diagram of a helical CT imaging modality.

FIG. 2 is a functional diagram 200 of a helical CT imaging modality. In such an imaging modality, the object 102 under examination is translated 204 (typically at a constant speed) along an axis (e.g., z-axis) via the support article 112. Typically, while the object 102 is being translated, one or more radiation sources 118 and/or the detector array 106 are rotated about the object 102 (in an x and/or y direction), causing the radiation source(s) 118 and/or the detector array 106 to follow a spiral- or helical-like trajectory 212 relative to the object 102 (e.g., where the source and detector array do not move in the z direction, and thus the helical trajectory is established by the combination of the x/y rotation of the source and detector array and the z-axis translation of the object).

Figure 3:
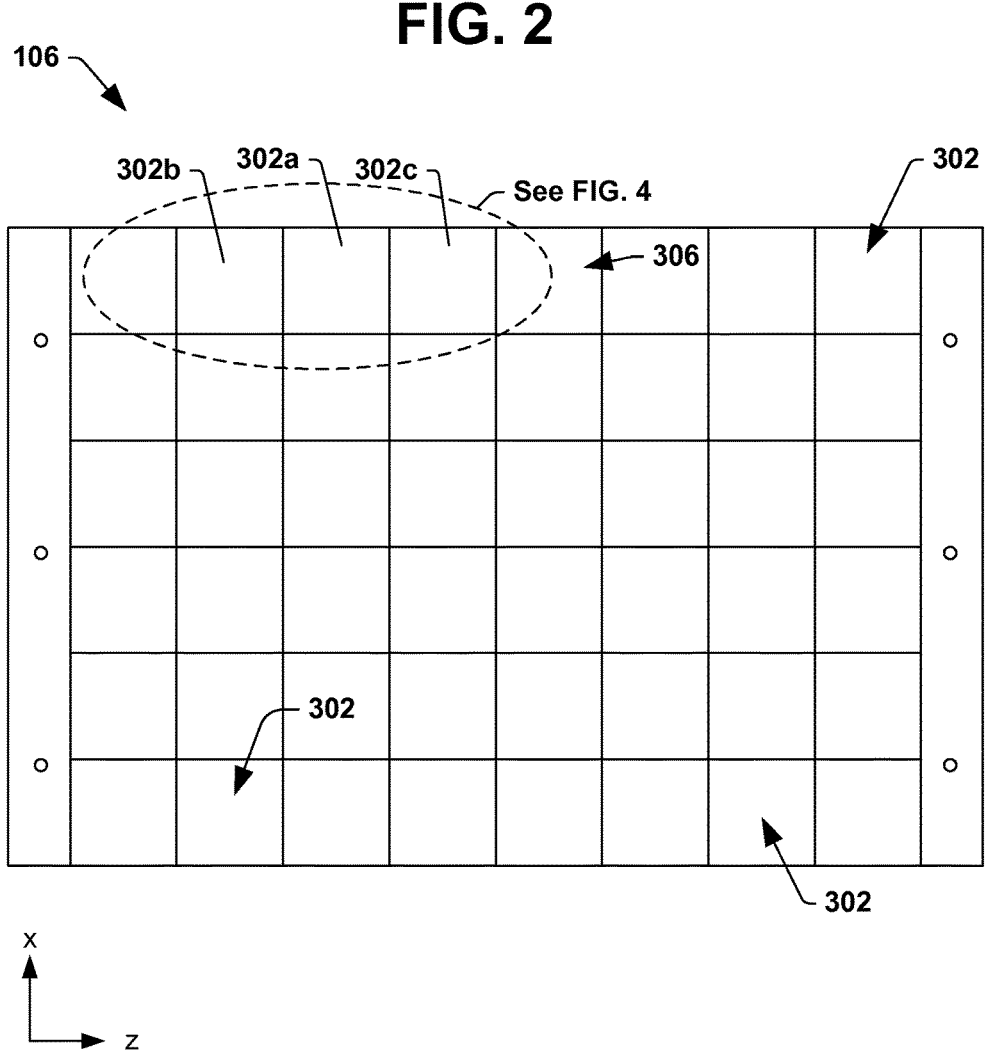
FIG. 3 illustrates a top down view of a portion of an example detector array.

FIG. 3 illustrates a top down view of a portion of the detector array 106. The detector array 106 comprises a plurality of pixels 302, typically arranged in columns (e.g., extending in the z-direction) and rows (e.g., extending in the x-direction). For example, the detector array 106 may include a first column 306 of pixels 302, which includes a first pixel 302a positioned between (e.g., adjacent) a second pixel 302b and a third pixel 302c. Where the detector array is rotated in an x, y plane, columns of the detector array thus extend perpendicular to the x, y plane. In some embodiments, a pitch between pixels 302 (e.g., measured from a center of a first pixel to the center of an adjacent pixel) may be approximately 1 millimeter, although the pitch may vary by application.

As will be described in more detail below, respective pixels 302 comprise a conversion material configured to directly and/or indirectly convert the radiation into electrical energy. For example, where the pixels 302 are configured for direct conversion, respective pixels may comprise a direct conversion material configured to convert radiation energy into electrical energy. As another example, where the pixels 302 are configured for indirect conversion, respective pixels may comprise an indirect conversion material configured to convert radiation energy into light energy and one or more photodetector configured to convert the light energy into electrical energy.

Figure 4A:
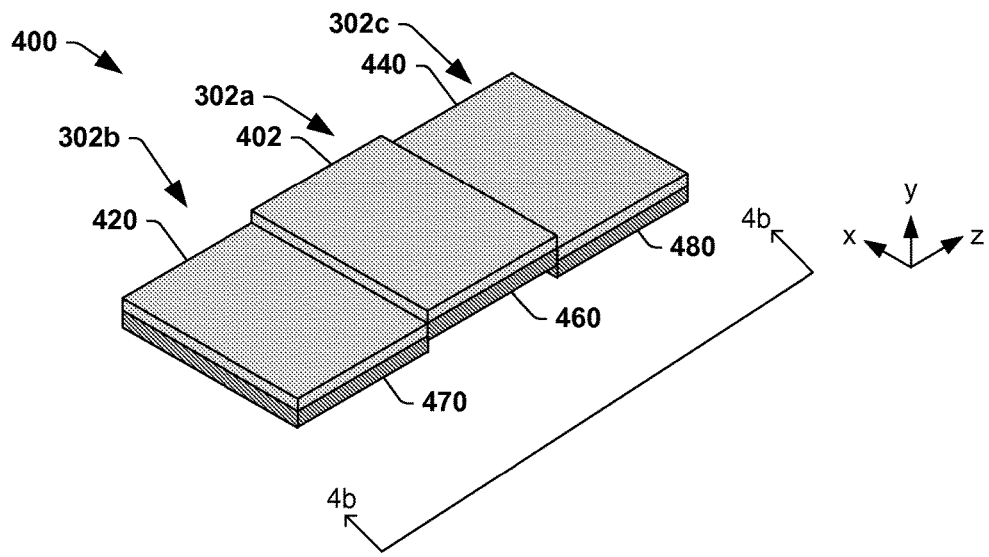
FIG. 4a illustrates a perspective view of a portion of an example detector array.
Figure 4B:
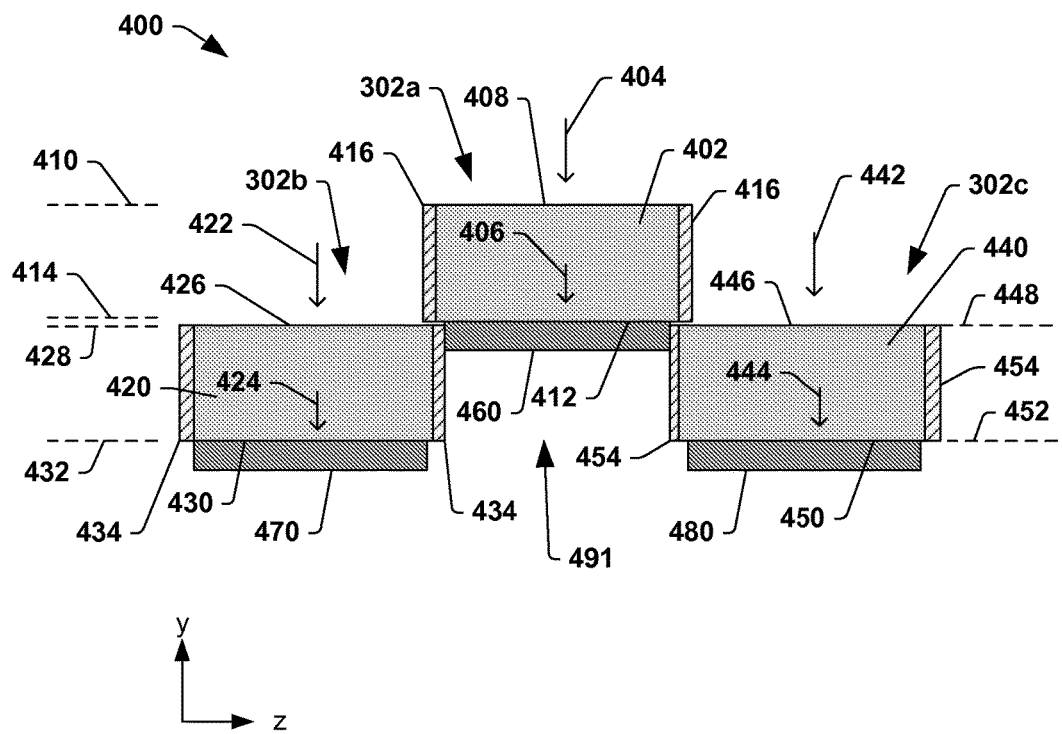
FIG. 4b illustrates a side view of a portion of an example detector array.

Turning to FIGS. 4a and 4b, a portion 400 of the detector array 106 is illustrated where FIG. 4a is a perspective view and FIG. 4b is a side view as seen from a perspective indicated by lines 4b-4b in FIG. 4a. As illustrated, the portion 400 comprises of a plurality of pixels 302a-302c, including the first pixel 302a, the second pixel 302b, and the third pixel 302c. The pixels 302a-302c can be supported in any number of ways, such as by being coupled to a mounting bracket and/or to a rotating gantry, for example.

In an example, the first pixel 302a comprises a first scintillator 402. The first scintillator 402 can detect a radiation photon (e.g., a first radiation photon 404) and convert the first radiation photon 404 into first light energy 406. In the illustrated example, the first scintillator 402 comprises a first detection surface 408 through which the first radiation photon 404 enters the first scintillator 402. The first detection surface 408 may, in some examples, be generally flat and/or planar, such that the first detection surface 408 extends along a first detection surface plane 410. In an example, the first detection surface 408 may face the radiation source(s) 118 (illustrated in FIGS. 1 and 2).

The first scintillator 402 comprises a first light emission surface 412 through which the first light energy 406 can exit the first scintillator 402. The first light emission surface 412 may, in some examples, be generally flat and/or planar, such that the first light emission surface 412 extends along a first light emission surface plane 414. In an example, the first light emission surface 412 may face an opposite direction from the first detection surface 408 and away from the radiation source(s) 118 (illustrated in FIGS. 1 and 2).

The first scintillator 402 may be at least partially surrounded by a first reflective material 416. The first reflective material 416 can reduce/limit cross-talk between adjacent scintillators. For example, the first reflective material 416 can reduce/limit light energy generated within the first scintillator 402 from entering another scintillator of the detector array 106, such as a second scintillator 420 and/or a third scintillator 440. The first reflective material 416 can also increase detector efficiency by reducing/limiting the loss of light energy associated with optical photons escaping the first scintillator 402 (e.g., escaping a lateral wall of the first scintillator 402 and not being detected by a first photodetector 460 positioned below the first scintillator 402). In the illustrated example of FIG. 4b, the first reflective material 416 may be disposed on lateral walls of the first scintillator 402 between the first detection surface 408 and the first light emission surface 412. The first reflective material 416 is not so limited however, and in other examples, may also be disposed, at least partially, on the first detection surface 408 while still allowing for the first radiation photon(s) 404 to enter the first scintillator 402. In such an example, the first reflective material 416 may be disposed on all walls/surfaces of the first scintillator 402 except for the first light emission surface 412 through which the first light energy 406 exits the first scintillator 402, for example.

Turning to the second pixel 302b, the second pixel 302b may be adjacent (e.g., next to) the first pixel 302a. The second pixel 302b comprises the second scintillator 420 configured to convert a second radiation photon 422 into second light energy 424. In the illustrated example, the second scintillator 420 comprises a second detection surface 426 through which the second radiation photon 422 enters the second scintillator 420. The second detection surface 426 may, in some examples, be generally flat and/or planar, such that the second detection surface 426 extends along a second detection surface plane 428. In an example, the second detection surface 426 may face the radiation source(s) 118 (illustrated in FIGS. 1 and 2).

The second scintillator 420 comprises a second light emission surface 430 through which the second light energy 424 can exit the second scintillator 420. The second light emission surface 430 may, in some examples, be generally flat and/or planar, such that the second light emission surface 430 extends along a second light emission surface plane 432. In an example, the second light emission surface 430 may face an opposite direction from the second detection surface 426 and away from the radiation source(s) 118 (illustrated in FIGS. 1 and 2).

The second scintillator 420 may be at least partially surrounded by a second reflective material 434. In the illustrated example of FIG. 4b, the second reflective material 434 may be disposed on lateral walls of the second scintillator 420 between the second detection surface 426 and second light emission surface 430. The second reflective material 434 is not so limited however, and in other examples, may also be disposed, at least partially, on the second detection surface 426 while still allowing for the second radiation photon(s) 422 to enter the second scintillator 420. In such an example, the second reflective material 434 may be disposed on all walls/surfaces of the second scintillator 420 except for the second light emission surface 430 through which the second light energy 424 exits the second scintillator 420.

Turning to the third pixel 302c, the third pixel 302c may be adjacent (e.g., next to) the first pixel 302a opposite the second pixel 302b. In an example, the third pixel 302c is generally coplanar with the second pixel 302b, while the first pixel 302a is not coplanar with the second pixel 302b or the third pixel 302c. The third pixel 302c comprises the third scintillator 440 configured to convert a third radiation photon 442 into third light energy 444. In the illustrated example, the third scintillator 440 comprises a third detection surface 446 through which the third radiation photon 442 enters the third scintillator 440. The third detection surface 446 may, in some examples, be generally flat and/or planar, such that the third detection surface 446 extends along a third detection surface plane 448. In an example, the third detection surface 446 may face the radiation source(s) 118 (illustrated in FIGS. 1 and 2).

The third scintillator 440 comprises a third light emission surface 450 through which the third light energy 444 can exit the third scintillator 440. The third light emission surface 450 may, in some examples, be generally flat and/or planar, such that the third light emission surface 450 extends along a third light emission surface plane 452. In an example, the third light emission surface 450 may face an opposite direction from the third detection surface 446 and away from the radiation source(s) 118 (illustrated in FIGS. 1 and 2).

The third scintillator 440 may be at least partially surrounded by a third reflective material 454. In the illustrated example of FIG. 4b, the third reflective material 454 may be disposed on lateral walls of the third scintillator 440 between the third detection surface 446 and third light emission surface 450. The third reflective material 454 is not so limited however, and in other examples, may also be disposed, at least partially, on the third detection surface 446 while still allowing for the third radiation photon(s) 442 to enter the third scintillator 440. In such an example, the third reflective material 454 may be disposed on all walls/surfaces of the third scintillator 440 except for the third light emission surface 450 through which the third light energy 444 exits the third scintillator 440.

The first pixel 302a may include a first photodetector 460. The first photodetector 460 can receive the first light energy 406 from the first scintillator 402 and convert the first light energy 406 into electrical energy. Upon being converted from the first light energy 406 into electrical energy, the electrical energy from the first photodetector 460 can be transmitted to the data acquisition component 122 (illustrated in FIG. 1) for conversion into digital data. In this example, the first photodetector 460 is adjacent the first light emission surface 412, such as by being located under/below and in close proximity to the first light emission surface 412.

The second pixel 302b may include a second photodetector 470. The second photodetector 470 can receive the second light energy 424 from the second scintillator 420 and convert the second light energy 424 into electrical energy. Upon being converted from the second light energy 424 into electrical energy, the electrical energy from the second photodetector 470 can be transmitted to the data acquisition component 122 (illustrated in FIG. 1) for conversion into digital data. In this example, the second photodetector 470 is adjacent the second light emission surface 430, such as by being located under/below and in close proximity to the second light emission surface 430.

The third pixel 302c may include a third photodetector 480. The third photodetector 480 can receive the third light energy 444 from the third scintillator 440 and convert the third light energy 444 into electrical energy. Upon being converted from the third light energy 444 into electrical energy, the electrical energy from the third photodetector 480 can be transmitted to the data acquisition component 122 (illustrated in FIG. 1) for conversion into digital data. In this example, the third photodetector 480 is adjacent the third light emission surface 450, such as by being located under/below and in close proximity to the third light emission surface 450. The first photodetector 460, second photodetector 470 and third photodetector 480 may comprise photodiodes, though other light converting electronic components are also contemplated, for example.

In some examples, as illustrated in FIGS. 4a and 4b, the first detection surface plane 410 is not coplanar with the second detection surface plane 428 and/or the third detection surface plane 448. In this example, the first detection surface 408 is positioned in closer proximity to the radiation source(s) 118 (illustrated in FIGS. 1 and 2) than the second detection surface 426 and/or the third detection surface 446. In some examples, the first light emission surface plane 414 is not coplanar with the second light emission surface plane 432 and/or the third light emission surface plane 452. In this example, the first light emission surface 412 may be positioned in closer proximity to the radiation source(s) 118 (illustrated in FIGS. 1 and 2) than the second light emission surface 430 and/or the third light emission surface 450. The first light emission surface plane 414 of FIGS. 4a and 4b may not intersect the second scintillator 420 and/or the third scintillator 440. In an example, the second detection surface plane 428 and/or the third detection surface plane 448 may not intersect the first scintillator 402.

It will be appreciated that while the reflective material reduces or inhibits light energy from escaping scintillators, the reflective material has little to no effect on radiation photons (e.g., reflective material is substantially transparent to radiation photons). Accordingly, as illustrated in FIG. 4b, the first reflective material 416 is able to overlap some of the second scintillator 420 and/or some of the third scintillator 440 while still allowing the second radiation photons 422 to enter the second scintillator 420 and/or allowing the third radiation photon 442 to enter the third scintillator 440. At least one of the second pixel 302b or the third pixel 302c may be shifted (e.g., to bring the second pixel 302b and the third pixel 302c closer to one anther) to achieve this reflective material to scintillator overlap (e.g., thus allowing more pixels to be included on the detector array). Alternatively, or in addition, at least one of the first pixel 302a, the second pixel 302b or the third pixel 302c may be enlarged in the z-direction to achieve this reflective material to scintillator overlap. For example, where the size of the first reflective material 416 is maintained in the z-direction, the size of at least one of the first scintillator 402, the second scintillator 420 or the third scintillator 440, and thus the size of the first detection surface 408, the second detection surface 426 and/or the third detection surface 446, may be increased in the z-direction (e.g., to increase an active area of one or more pixels without increasing the pitch of such pixels beyond 1 millimeter, for example). Pixels on a detector array are generally the same size and thus all three of the pixels may be increased in size in the z-direction by an equal amount (e.g., instead of merely increasing the size of the first pixel 302a). Moreover, given that the space 491 between the second pixel 302b and the third pixel 302c serves to mitigate cross talk (e.g., between the first pixel 302a and the second pixel 302b and/or between the first pixel 302a and the third pixel 302c), the size of at least one of the first reflective material 416, the second reflective material 434 or the third reflective material 454 may be reduced in the z-direction thus allowing for the scintillator material of the pixels to be enlarged further. Similarly, where the size of the pixels is not increased in the z-direction, but at least one of the first reflective material 416, the second reflective material 434 or the third reflective material 454 is reduced in the z-direction, the size of at least one of the first scintillator 402, the second scintillator 420 or the third scintillator 440, and thus the size of the first detection surface 408, the second detection surface 426 and/or the third detection surface 446, may be increased in the z-direction.

Given that the first pixel 302a, the second pixel 302b and the third pixel 302c are arranged in a column (as illustrated in FIG. 3) and thus are adjacent pixels in other columns, the staggered arrangement also allows the same results to be achieved in the x-direction. For example, pixels can be brought closer together in the x-direction allowing more pixels to be on the detector array (e.g., such that more radiation is detected by the detector array and/or such that higher fidelity images are produced from radiation detected by the detector array (e.g., more pixels or channels per unit area on the detector array)). Alternatively, or in addition, pixel size may be maintained in the x-direction but where reflective material is decreased in size in the x-direction while scintillator size (e.g., and thus detection surface) is increased in the x-direction. Alternatively, or in addition, pixel size may be increased where scintillator size (e.g., and thus detection surface) is increased in the x-direction and reflective material size may or may not be increased or decreased in the x-direction.

It will be appreciated that the effective detection area of a pixel (e.g., detection surface) may be substantially increased pursuant to the staggered or non-planar implementation presented in FIGS. 4a and 4b. For example, a detection surface of a 1 $mm^2$ pixel may be on the order of 0.95 mm in the x and y directions, for an effective detection area of around 0.9 $mm^2$ with the staggered or non-uniform pixel configuration. In contrast, in the absence of the non-uniform arrangement, a detection surface of a 1 $mm^2$ pixel may be on the order of 0.8 mm in the x and y directions (e.g., due to the amount of reflective material needed between adjacent pixels to sufficiently reduce cross talk), for an effective detection area of around 0.64 $mm^2$. Thus, the non-uniform arrangement allows more radiation to be detected with a same size detector array by increasing the effective detection area of pixels on the detector array and/or by allowing more pixels to be included on the detector array.

Figure 5A:
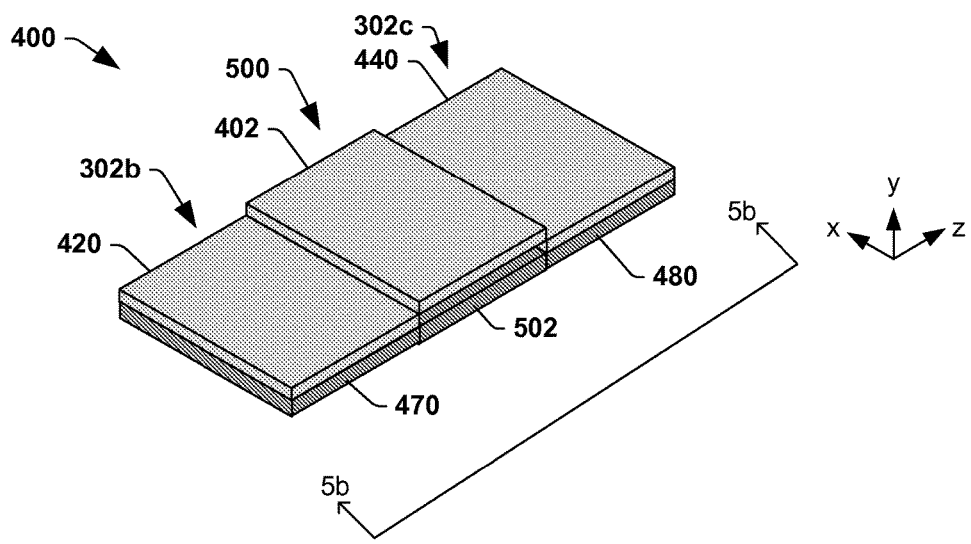
FIG. 5a illustrates a perspective view of a portion of an example detector array.
Figure 5B:
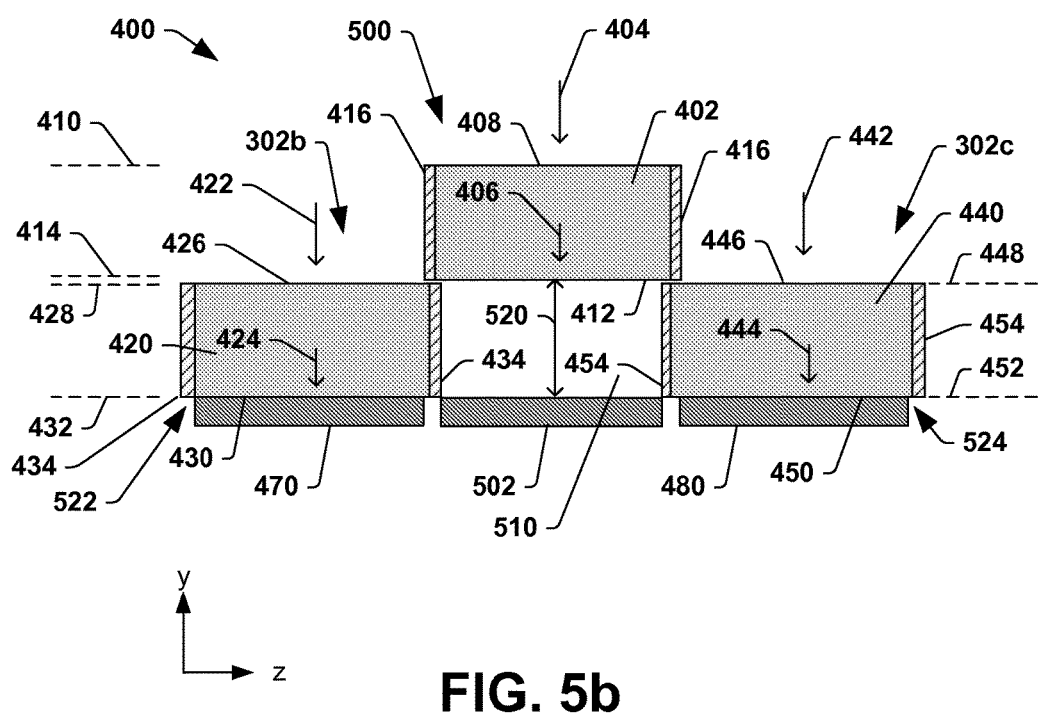
FIG. 5b illustrates a side view of a portion of an example detector array.

Turning to FIGS. 5a and 5b, the portion 400 of the detector array 106 is illustrated where FIG. 5a is a perspective view and FIG. 5b is a side view as seen from a perspective indicated by lines 5b-5b in FIG. 5a. In this example, the second pixel 302b and third pixel 302c are generally identical to the second pixel 302b and third pixel 302c described above with respect to FIGS. 4a and 4b. A first pixel 500 is provided in FIGS. 5a and 5b. The first pixel 500 may include the first scintillator 402, first reflective material 416, etc.

In the illustrated example, the first pixel 500 comprises a first photodetector 502 and an optical carrier 510. The first photodetector 502 may be generally identical in structure, shape, etc. as the first photodetector 460 of FIGS. 4a and 4b. In this example, the optical carrier 510 may be situated between the first light emission surface 412 and the first photodetector 502. The optical carrier 510 can carry the first light energy 406 between the first scintillator 402 and the first photodetector 502. It will be appreciated that the optical carrier 510 may include, for example, a gap, space, opening, or the like. The optical carrier 510 may be filled with air, or, in other examples, may be filled with gas and/or an optical fiber, for example so as to allow for the first light energy 406 to pass therethrough.

In this example, the first photodetector 502 is spaced a first distance 520 from the first scintillator 402. While the first distance 520 comprises any number of distances, in some possible examples, the first distance 520 is between about 0.5 mm to about 1.5 mm. In an example, the second photodetector 470 is spaced a second distance 522 from the second scintillator 420 while the third photodetector 480 is spaced a third distance 524 from the third scintillator 440. In some examples, the first distance 520 is different than the second distance 522 and/or the third distance 524. In the illustrated example, the first distance 520 may be greater/larger than the second distance 522 and/or the third distance 524. In some examples, the second photodetector 470 may be in contact with the second scintillator 420 and/or the third photodetector 480 may be in contact with the third scintillator 440, such that the second distance 522 and/or the third distance 524 may be zero or about zero. However, the illustrated distances (e.g., first distance 520, second distance 522 and third distance 524) of FIGS. 5a and 5b are not intended to be limiting, as any number of distances are envisioned.

Figure 6:
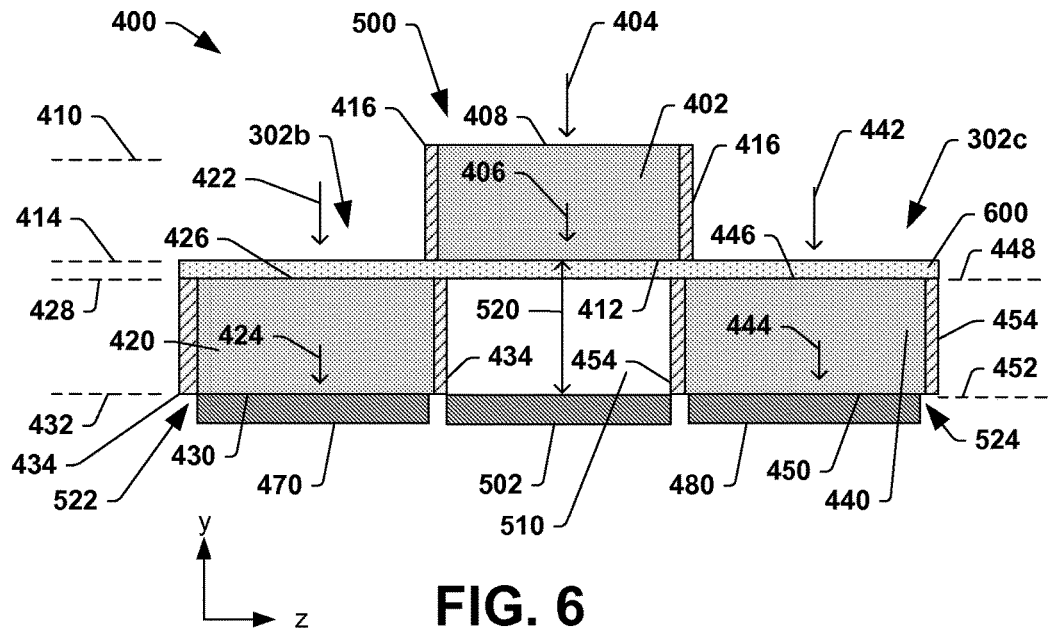
FIG. 6 illustrates a side view of a portion of an example detector array.

Turning now to FIG. 6, the portion 400 of the detector array 106 of FIGS. 5a and 5b is illustrated. In this example, a support structure 600 may be provided for supporting the first scintillator 402. The support structure 600 can extend partially or completely across the first pixel 500, the second pixel 302b and/or the third pixel 302c. The support structure 600 can be positioned adjacent and/or in contact with the first light emission surface 412 of the first scintillator 402. As such, the first scintillator 402 can rest upon the support structure 600. The support structure 600 comprises any number of materials that allow for the light energy (e.g., the first light energy 406), as well as for the second radiation photons 422 and/or the third radiation photons 442, to pass through (e.g., such that the support structure 600 is substantially transparent to radiation and to light). In operation, the first light energy 406 can pass from the first scintillator 402, through the support structure 600 and to the first photodetector 502.

Figure 7:
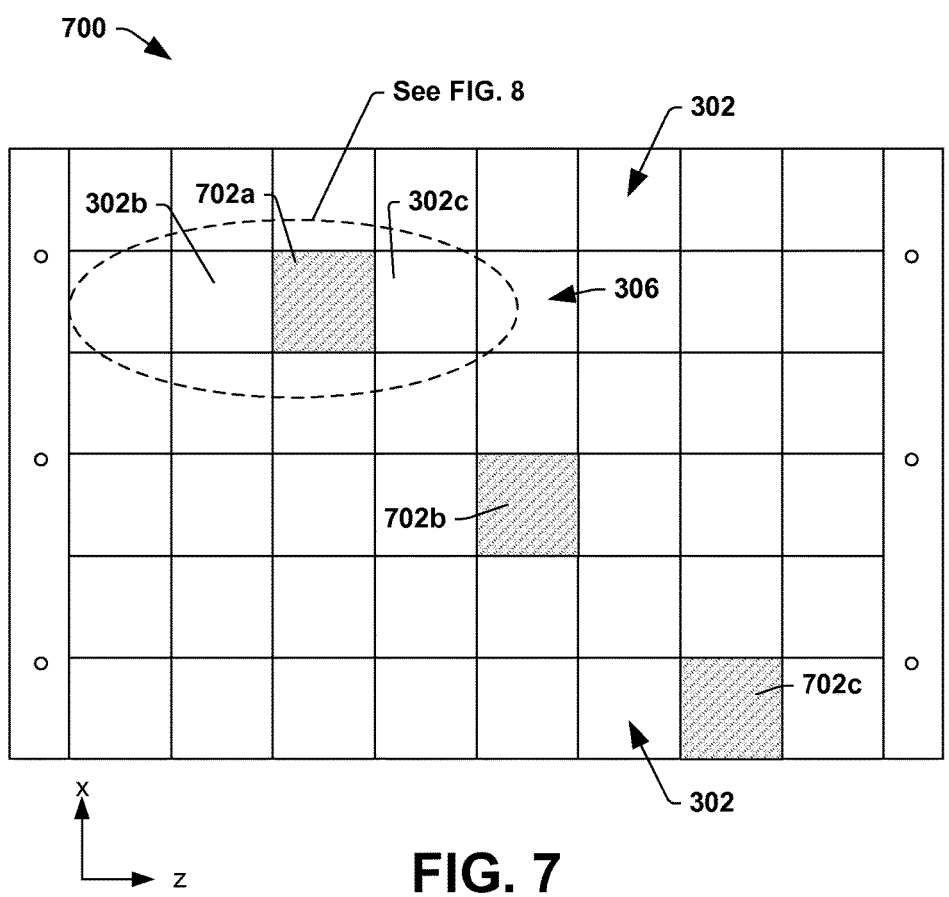
FIG. 7 illustrates a top down view of a portion of an example detector array.

FIG. 7 illustrates a top down view of a portion of a second detector array 700. As illustrated, the second detector array 700 may include a column 306 of pixels that include a first pixel 702a, the second pixel 302b, and the third pixel 302c. It may be appreciated that any number of pixels may be configured similar to the first pixel 702a. For example, a fourth pixel 702b in a second column and a third pixel 702c in a third column may have a configuration similar to the configuration of the first pixel 702a. Accordingly, pixels having a configuration similar to the configuration of the first pixel 702a may be (e.g., sparsely) scattered through the detector array in a patterned (e.g., checkerboard pattern, pillared pattern (e.g., where an entire column or row of the detector array comprises pixels having such a configuration), etc.) or a random fashion. Any number of first pixels 702a can be provided as part of the second detector array 700.

Figure 8A:
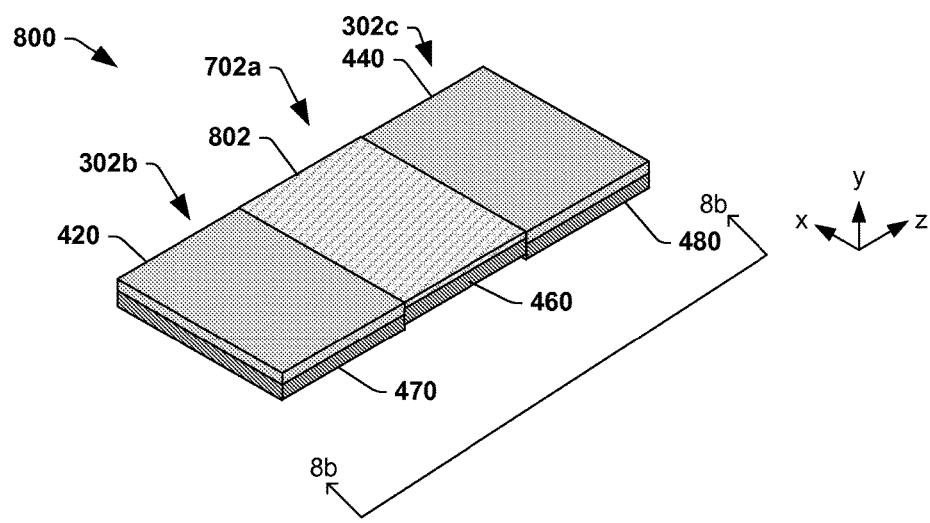
FIG. 8a illustrates a perspective view of a portion of an example detector array.
Figure 8B:
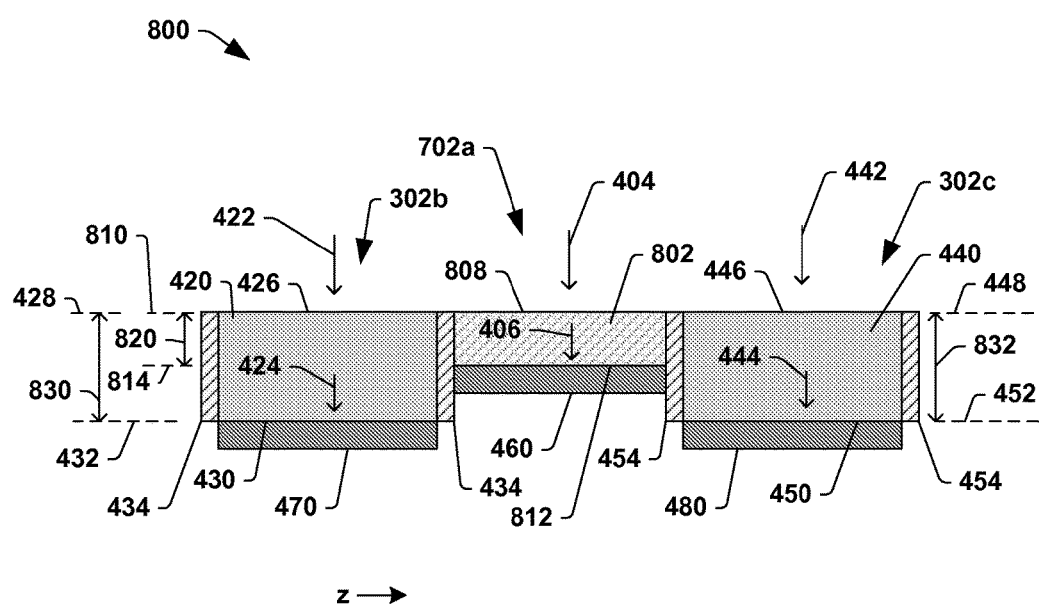
FIG. 8b illustrates a side view of a portion of an example detector array.

Turning to FIGS. 8a and 8b, a portion 800 of the second detector array 700 is illustrated where FIG. 8a is a perspective view and FIG. 8b is a side view as seen from a perspective indicated by lines 8b-8b in FIG. 8a. In this example, the portion 800 comprises a plurality of pixels, including the first pixel 702a, the second pixel 302b, and the third pixel 302c. The pixels 302b, 302c, and 702a can be supported in any number of ways, such as by being coupled to a mounting bracket and/or rotating gantry, for example.

In an example, the first pixel 702a comprises a first scintillator 802. The first scintillator 802 is generally identical to the first scintillator 402 described above with respect to FIGS. 4a and 4b. Indeed, the first scintillator 802 can detect the first radiation photon 404 and convert the first radiation photon 404 into first light energy 406. The first scintillator 802 comprises a first detection surface 808 through which the first radiation photon 404 enters the first scintillator 802. The first detection surface 808 may be generally flat and/or planar, such that the first detection surface 808 extends along a first detection surface plane 810. The first detection surface 808 may face the radiation source(s) 118 (illustrated in FIGS. 1 and 2).

The first scintillator 802 comprises a first light emission surface 812 through which the first light energy 406 can exit the first scintillator 802. The first light emission surface 812 may, in some examples, be generally flat and/or planar, such that the first light emission surface 812 extends along a first light emission surface plane 814. In an example, the first light emission surface 812 may face an opposite direction from the first detection surface 808.

In the illustrated example, the first detection surface plane 810 may be coplanar with the second detection surface plane 428 and/or the third detection surface plane 448. In an example, the first light emission surface plane 814 is not coplanar with the second light emission surface plane 432 and/or the third light emission surface plane 452. For example, the first scintillator 802 has a first scintillator thickness 820 between the first detection surface 808 and the first light emission surface 812. The second scintillator 420 has a second scintillator thickness 830 between the second detection surface 426 and the second light emission surface 430. The third scintillator 440 has a third scintillator thickness 832 between the third detection surface 446 and the third light emission surface 450. In this example, the second scintillator thickness 830 and/or the third scintillator thickness 832 are different than the first scintillator thickness 820. For example, the first scintillator thickness 820 may be smaller/less than the second scintillator thickness 830 and/or the third scintillator thickness 832.

By providing the first scintillator 802 with the first scintillator thickness 820 that is less than the second scintillator thickness 830 and/or the third scintillator thickness 832, the first scintillator 802 can measure radiation photons having a different energy spectrum than the second scintillator 420 and/or the third scintillator 440. For example, the first scintillator 802 can measure radiation photons (e.g., first radiation photons 404) having a first energy spectrum. The second scintillator 420 can measure radiation photons (e.g., second radiation photons 422) having a second energy spectrum different than the first energy spectrum. Likewise, the third scintillator 440 can measure radiation photons (e.g., third radiation photons 442) having a third energy spectrum different than the first energy spectrum.

In this example, the first energy spectrum may comprise lower energy radiation photons while the second energy spectrum and/or third energy spectrum may comprise high energy radiation photons and/or a full energy spectrum (e.g., high and low energy radiation photons). In operation, data yielded from the first pixel 702a and indicative of the lower energy radiation photons (e.g., as measured by the first scintillator 802) can be combined with data yielded from the second pixel 302b and/or the third pixel 302c and indicative of the higher energy radiation photons (e.g., as measured by the second scintillator 420 and/or the third scintillator 440) to calculate an effective atomic number ($Z_{eff}$) of objects scanned by a radiation imaging modality implementing the second detector array 700 (e.g., such as through interpolation techniques that interpolate the total radiation that would have been detected by the first pixel 702a had the first pixel been configured to detect both high and low energy photons). It may be appreciated that by sparsely placing pixels having a first configuration (e.g., the first scintillator thickness) among other pixels having a second configuration (e.g., the second scintillator thickness and/or the third scintillator thickness) a dual energy detector array may be created that is less costly than other forms of dual energy detector arrays, such as a detector array constructed using photon counting technologies and/or sandwich technologies.

Figure 9A:
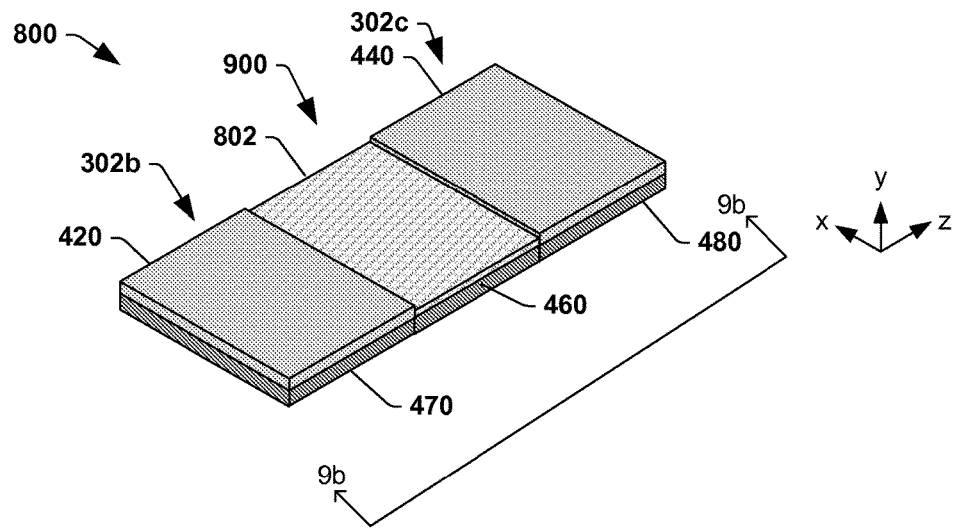
FIG. 9a illustrates a perspective view of a portion of an example detector array.
Figure 9B:
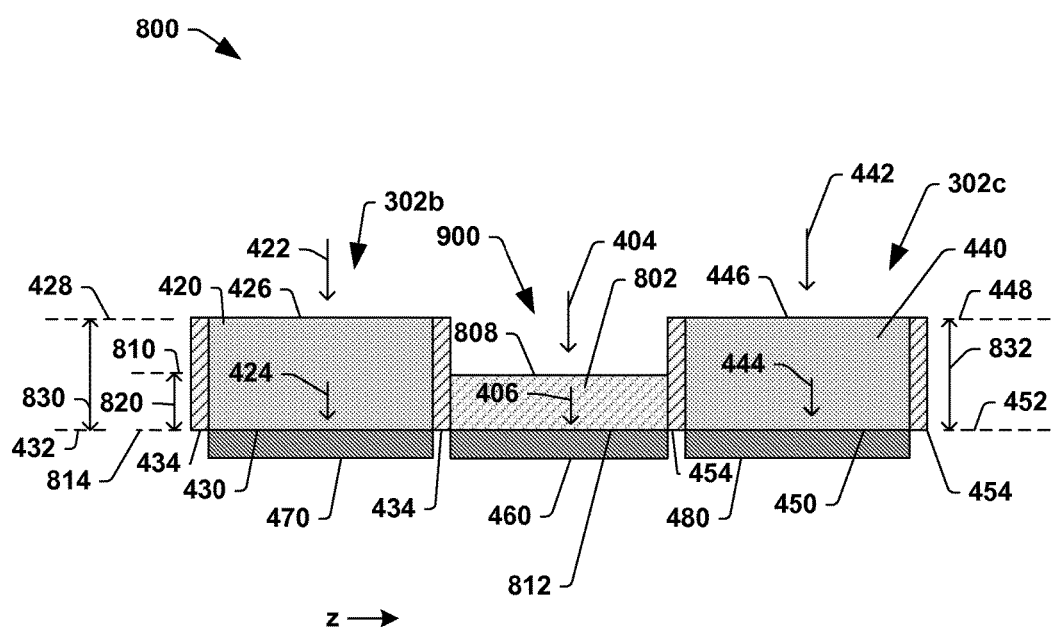
FIG. 9b illustrates a side view of a portion of an example detector array.

Turning now to FIGS. 9a and 9b, the portion 800 of the second detector array 700 is illustrated where FIG. 9a is a perspective view and FIG. 9b is a side view as seen from a perspective indicated by lines 9b-9b in FIG. 9a. The portion 800 can include a first pixel 900 comprising the first scintillator 802 and the first photodetector 460 (e.g., the detector array 700 has the first pixel 900 instead of the first pixel 702a). In this example, the first detection surface plane 810 is not coplanar with the second detection surface plane 428 and/or the third detection surface plane 448. In this example, the first light emission surface plane 814 is coplanar with the second light emission surface plane 432 and/or the third light emission surface plane 452. As with the previous example illustrated in FIGS. 8a and 8b, the first scintillator 802 can measure radiation photons (e.g., first radiation photons 404) having a first energy spectrum that is different (e.g., lower) than the second energy spectrum of the second scintillator 420 and/or the third energy spectrum of the third scintillator 440.

Figure 10A:
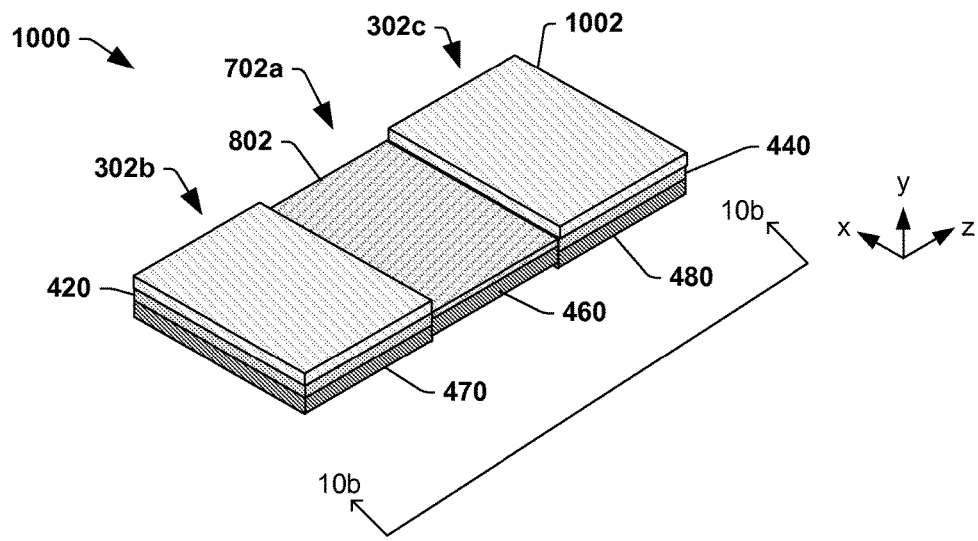
FIG. 10a illustrates a perspective view of a portion of an example detector array.
Figure 10B:
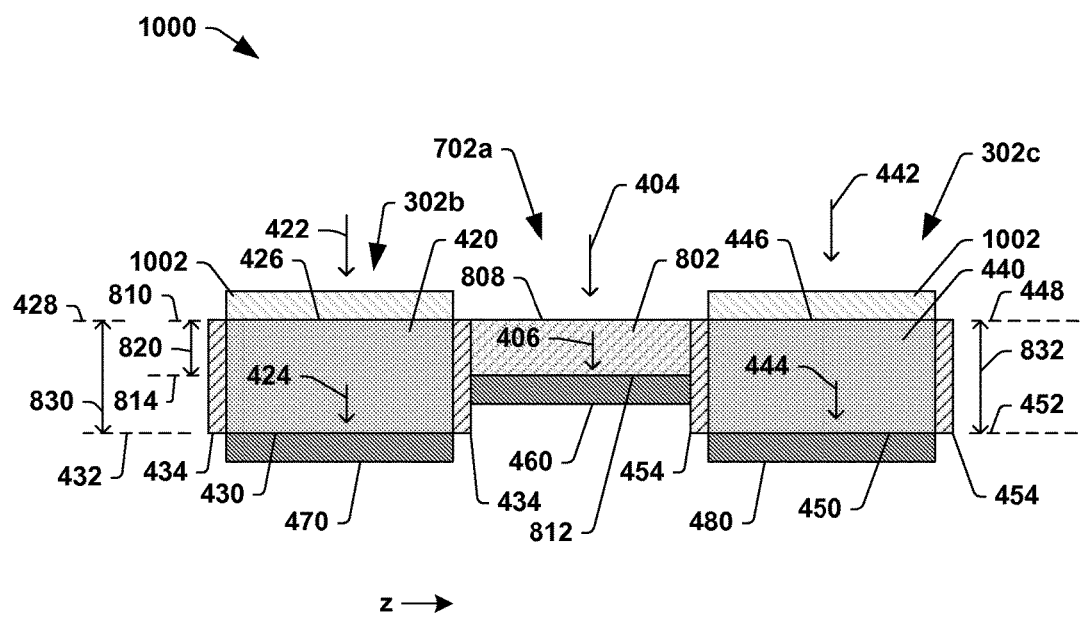
FIG. 10b illustrates a side view of a portion of an example detector array.

Turning now to FIGS. 10a and 10b, a portion 1000 of the second detector array 700 is illustrated where FIG. 10a is a perspective view and FIG. 10b is a side view as seen from a perspective indicated by lines 10b-10b in FIG. 10a. As illustrated, the portion 1000 may include the first pixel 702a, second pixel 302b, and third pixel 302c. In this example, a filter 1002 may be provided covering portions of the pixels 302 (e.g., first pixel 702a, second pixel 302b, and/or third pixel 302c). For example, as illustrated, two filters 1002 may be provided, with one of the filters 1002 provided over the second scintillator 420 and the other of the filters 1002 provided over the third scintillator 440. In this example, the second pixel 302b and third pixel 302c comprise the filters 1002 while the first pixel 702a does not comprise the filter 1002. In an example, the filters 1002 can filter out radiation photons having a certain energy spectrum. For instance, in an example, the filters 1002 can filter out radiation photons having the first energy spectrum (e.g., low energy) from reaching the second scintillator 420 and/or the third scintillator 440.

Figure 11A:
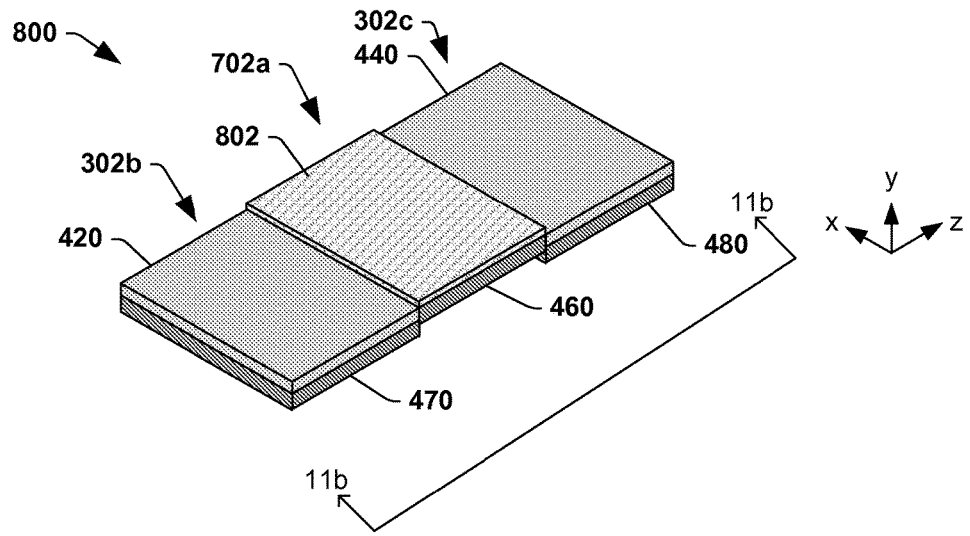
FIG. 11a illustrates a perspective view of a portion of an example detector array.
Figure 11B:
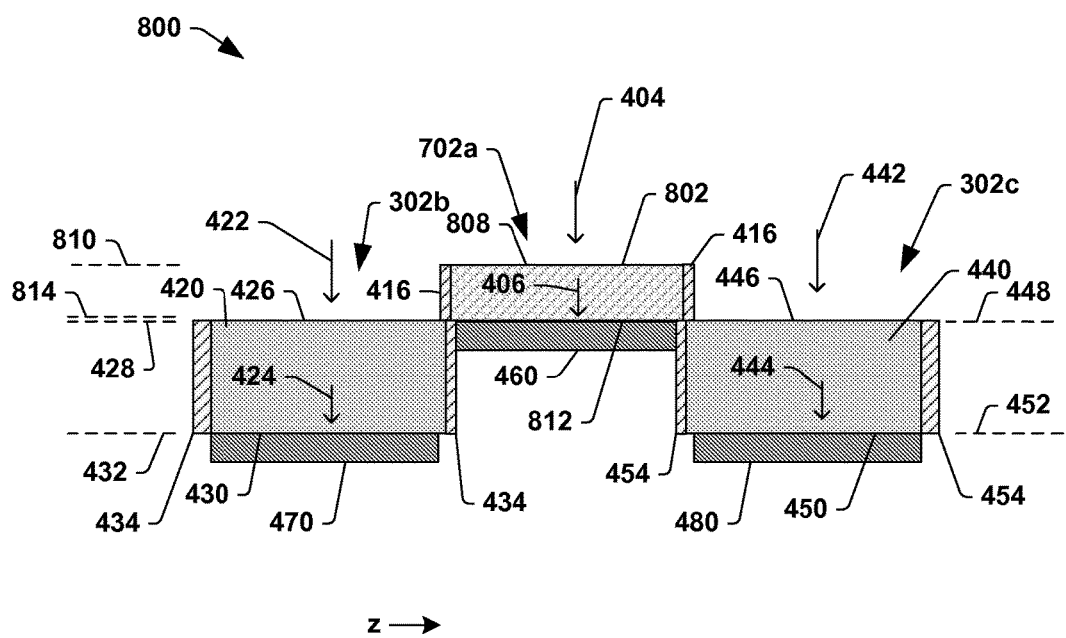
FIG. 11b illustrates a side view of a portion of an example detector array.

Turning to FIGS. 11a and 11b, the portion 800 of the second detector array 700 is illustrated where FIG. 11a is a perspective view and FIG. 11b is a side view as seen from a perspective indicated by lines 11b-11b in FIG. 11a. In this example, the first scintillator 802 is non-planar and/or "staggered" with respect to the second scintillator 420 and/or the third scintillator 440. For example, the first detection surface plane 810 is not coplanar with the second detection surface plane 428 and/or the third detection surface plane 448. In this example, the first detection surface 808 is positioned in closer proximity to the radiation source(s) 118 (illustrated in FIGS. 1 and 2) than the second detection surface 426 and/or the third detection surface 446. In some examples, the first light emission surface plane 814 is not coplanar with the second light emission surface plane 432 and/or the third light emission surface plane 452.

In this example, the first light emission surface 812 is positioned in closer proximity to the radiation sources (illustrated in FIGS. 1 and 2) than the second light emission surface 430 and/or the third light emission surface 450. The first light emission surface plane 814 of FIGS. 11a and 11b may not intersect the second scintillator 420 and/or the third scintillator 440. In an example, the second detection surface plane 428 and/or the third detection surface plane 448 may not intersect the first scintillator 802. Accordingly, as a result of this non-planar, "staggered" layout, the respective sizes of the first pixel 702a, second pixel 302b and third pixel 302c may be increased and/or more pixels may be included on the detector array, such as previously described with respect to FIGS. 4a and 4b.

Figure 12A:
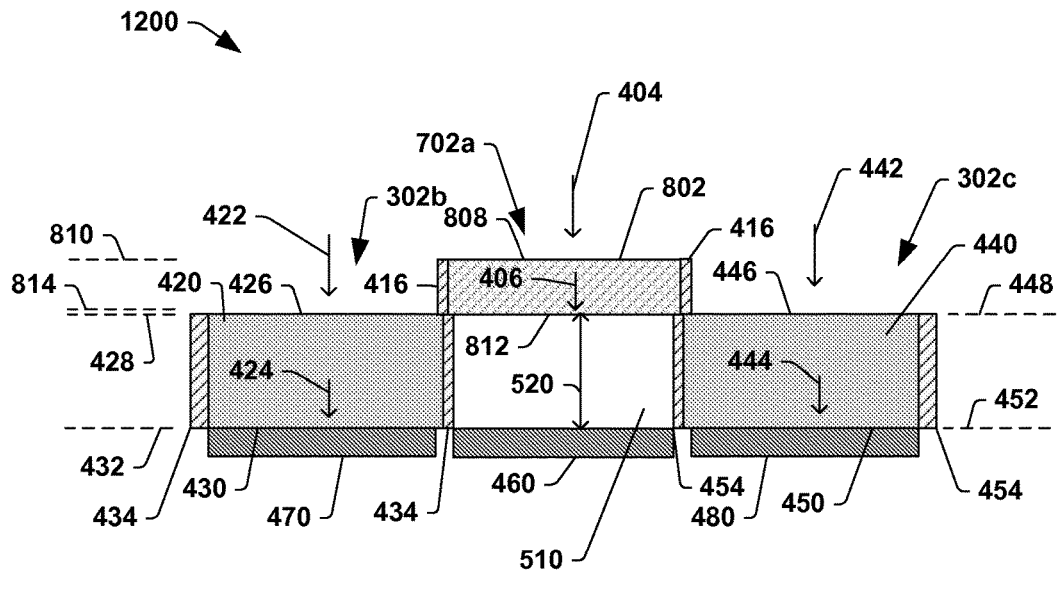
FIG. 12a illustrates a side view of a portion of an example detector array.

Turning to FIG. 12a, a portion 1200 of the second detector array 700 is illustrated. In this example, the portion 1200 may include the first pixel 702a, the second pixel 302b, and the third pixel 302c. In this example, the first pixel 702a comprises the optical carrier 510 situated between the first light emission surface 812 of the first scintillator 802 and the first photodetector 460. The optical carrier 510 can carry the first light energy 406 between the first scintillator 802 and the first photodetector 460.

Figure 12B:
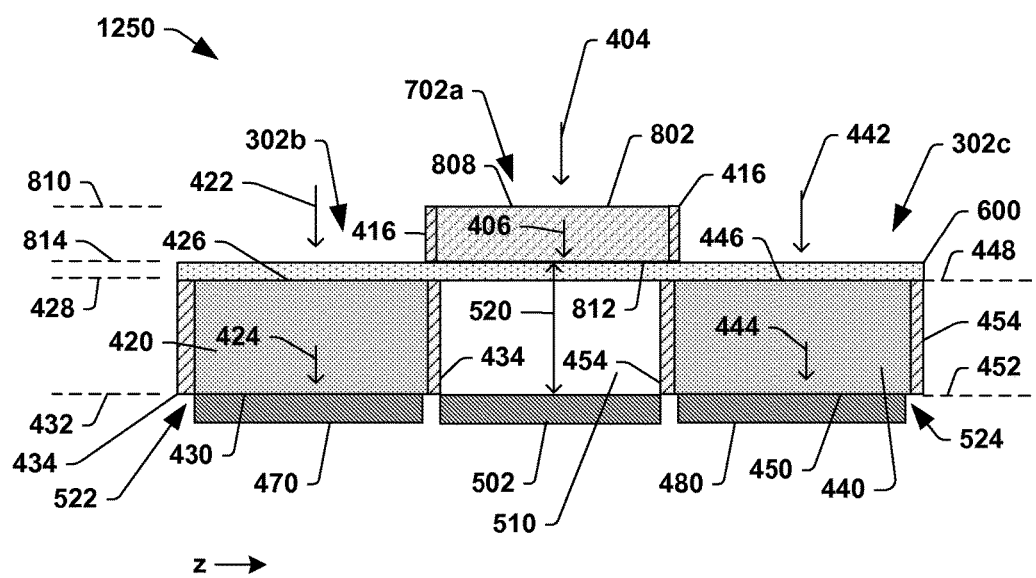
FIG. 12b illustrates a side view of a portion of an example detector array.

Turning to FIG. 12b, a portion 1250 of the second detector array 700 is illustrated. In this example, the portion 1250 may include the first pixel 702a, the second pixel 302b, and the third pixel 302c. The support structure 600 is provided for supporting the first scintillator 802. The support structure 600 can extend partially or completely across the first pixel 702a, the second pixel 302b and/or the third pixel 302c. The support structure 600 can be positioned adjacent and/or in contact with the first light emission surface 812 of the first scintillator 802. As such, the first scintillator 802 can rest upon the support structure 600. In operation, the first light energy 406 can pass from the first scintillator 802, through the support structure 600, through the optical carrier 510, to the first photodetector 460.

In some possible examples, such as the examples illustrated in FIGS. 7 to 11, the first scintillator 402, 802, second scintillator 420 and/or third scintillator 440 may have different compositions. In one possible example, the first scintillator 402, 802, second scintillator 420 and third scintillator 440 may have the same composition (e.g., comprise the same material(s)). In another example, the first scintillator 402, 802 may have a first composition while the second scintillator 420 has a second composition that is different than the first composition. Likewise, the third scintillator 440 may have the first composition, the second composition, or a third composition, with the third composition being different than the first composition and/or the second composition. In these examples, by providing different compositions, the first scintillator 402, 802, second scintillator 420 and/or third scintillator 440 may be able to better detect certain energy spectrums (e.g., low energy, high energy, etc.).

It may be appreciated that while the foregoing examples described configurations for pixels configured to indirectly convert radiation into electrical energy, such configurations may find applicability to pixels configured to directly convert radiation into electrical energy. By way of example, the scintillator and/or photodetector of a pixel may be substituted with a direct conversion material to convert the pixel from indirect conversion to direct conversion.

Figure 13:
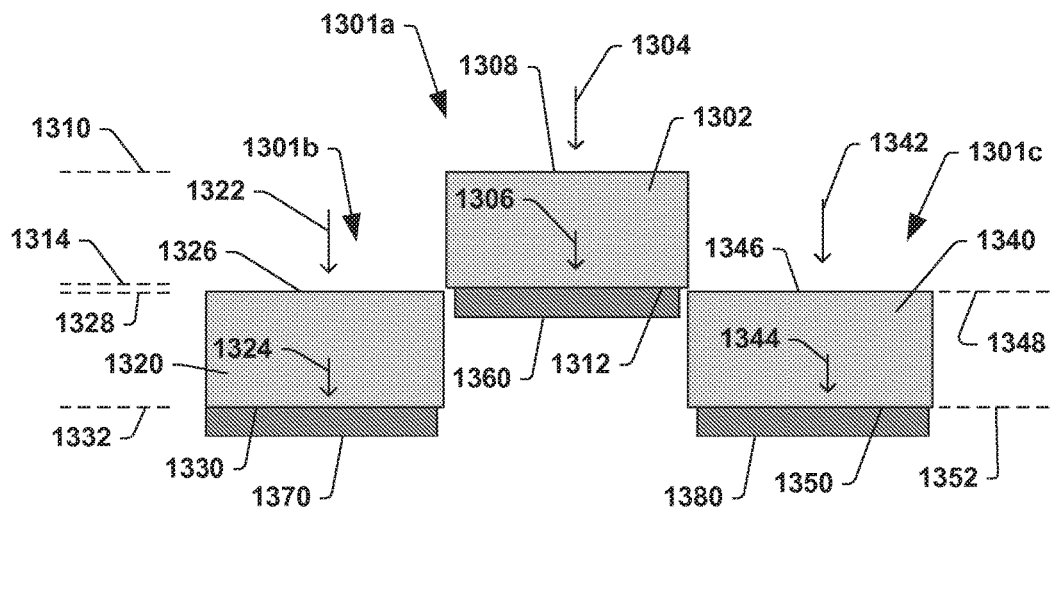
FIG. 13 illustrates a side view of a portion of an example detector array.

Referring to FIG. 13, an example configuration of pixels 1301a-1301c configured for direct conversion is illustrated. Such pixels 1301a-1301c can be supported in any number of ways, such as by being coupled to a mounting bracket and/or to a rotating gantry, for example.

In an example, the first pixel 1301a comprises a first direct conversion material 1302. The first direct conversion material 1302 can detect a radiation photon (e.g., a first radiation photon 1304) and convert the first radiation photon 1304 into a first electrical charge 1306. In the illustrated example, the first direct conversion material 1302 comprises a first detection surface 1308 through which the first radiation photon 1304 enters the first direct conversion material 1302. The first detection surface 1308 may, in some examples, be generally flat and/or planar, such that the first detection surface 1308 extends along a first detection surface plane 1310. In an example, the first detection surface 1308 may face the radiation source(s) 118 (illustrated in FIGS. 1 and 2).

The first direct conversion material 1302 comprises a first emission surface 1312 through which the first electrical charge 1306 can exit the first direct conversion material 1302. The first emission surface 1312 may, in some examples, be generally flat and/or planar, such that the first emission surface 1312 extends along a first emission surface plane 1314. In an example, the first emission surface 1312 may face an opposite direction from the first detection surface 1308 and away from the radiation source(s) 118 (illustrated in FIGS. 1 and 2).

The direct conversion material may comprise any number of direct conversion material layers that are configured to generate electrical charge in response to radiation energy impinging thereon. Such direct conversion materials may comprise amorphous selenium, cadmium zinc telluride (CdZnTe), and/or silicon, for example.

Turning to the second pixel 1301b, the second pixel 1301b may be adjacent (e.g., next to) the first pixel 1301a. The second pixel 1301b comprises a second direct conversion material 1320. The second direct conversion material 1320 can detect a radiation photon (e.g., a second radiation photon 1322) and convert the second radiation photon 1322 into a second electrical charge 1324. In the illustrated example, the second direct conversion material 1320 comprises a second detection surface 1326 through which the second radiation photon 1322 enters the second direct conversion material 1320. The second detection surface 1326 may, in some examples, be generally flat and/or planar, such that the second detection surface 1326 extends along a second detection surface plane 1328. In an example, the second detection surface 1326 may face the radiation source(s) 118 (illustrated in FIGS. 1 and 2).

The second direct conversion material 1320 comprises a second emission surface 1330 through which the second electrical charge 1324 can exit the second direct conversion material 1320. The second emission surface 1330 may, in some examples, be generally flat and/or planar, such that the second emission surface 1330 extends along a second emission surface plane 1332. In an example, the second emission surface 1330 may face an opposite direction from the second detection surface 1326 and away from the radiation source(s) 118 (illustrated in FIGS. 1 and 2).

Turning to the third pixel 1301c, the third pixel 1301c may be adjacent (e.g., next to) the first pixel 1301a opposite the second pixel 1301b. In an example, the third pixel 1301c is generally coplanar with the second pixel 1301b, while the first pixel 1301a is not coplanar with the second pixel 1301b or the third pixel 1301c. The third pixel 1301c comprises a third direct conversion material 1340. The third direct conversion material 1340 can detect a radiation photon (e.g., a third radiation photon 1342) and convert the third radiation photon 1342 into third electrical charge 1344. In the illustrated example, the third direct conversion material 1340 comprises a third detection surface 1346 through which the third radiation photon 1342 enters the third direct conversion material 1340. The third detection surface 1346 may, in some examples, be generally flat and/or planar, such that the third detection surface 1346 extends along a third detection surface plane 1348. In an example, the third detection surface 1346 may face the radiation source(s) 118 (illustrated in FIGS. 1 and 2).

The third direct conversion material 1340 comprises a third emission surface 1350 through which the third electrical charge 1344 can exit the third direct conversion material 1340. The third emission surface 1350 may, in some examples, be generally flat and/or planar, such that the third emission surface 1350 extends along a third emission surface plane 1352. In an example, the third emission surface 1350 may face an opposite direction from the third detection surface 1346 and away from the radiation source(s) 118 (illustrated in FIGS. 1 and 2).

The first pixel 1301a may include a first detection layer 1360. The first detection layer 1360 may comprise a thin-film transistor (TFT) or other readout component and can receive/detect the first electrical charge 1306 from the first direct conversion material 1302. This information can be transmitted from the first detection layer 1360 to the data acquisition component 122 (illustrated in FIG. 1) for conversion into digital data. In this example, the first detection layer 1360 is adjacent the first emission surface 1312, such as by being located under/below and in close proximity to the first emission surface 1312.

The second pixel 1301b may include a second detection layer 1370. The second detection layer 1370 can receive/detect the second electrical charge 1324 from the second direct conversion material 1320. This information can be transmitted from the second detection layer 1370 to the data acquisition component 122 (illustrated in FIG. 1) for conversion into digital data. In this example, the second detection layer 1370 is adjacent the second emission surface 1330, such as by being located under/below and in close proximity to the second emission surface 1330.

The third pixel 1301c may include a third detection layer 1380. The third detection layer 1380 can receive/detect the third electrical charge 1344 from the third direct conversion material 1340. This information can be transmitted from the third detection layer 1380 to the data acquisition component 122 (illustrated in FIG. 1) for conversion into digital data. In this example, the third detection layer 1380 is adjacent the third emission surface 1350, such as by being located under/below and in close proximity to the third emission surface 1350.

In some examples, as illustrated in FIG. 13, the first detection surface plane 1310 is not coplanar with the second detection surface plane 1328 and/or the third detection surface plane 1348. In this example, the first detection surface 1308 is positioned in closer proximity to the radiation source(s) 118 (illustrated in FIGS. 1 and 2) than the second detection surface 1326 and/or the third detection surface 1346. In some examples, the first emission surface plane 1314 is not coplanar with the second emission surface plane 1332 and/or the third emission surface plane 1352. In this example, the first emission surface 1312 may be positioned in closer proximity to the radiation sources source(s) (illustrated in FIGS. 1 and 2) than the second emission surface 1330 and/or the third emission surface 1350. The first emission surface plane 1314 of FIG. 13 may not intersect the second direct conversion material 1320 and/or the third direct conversion material 1340. In an example, the second detection surface plane 1328 and/or the third detection surface plane 1348 may not intersect the first direct conversion material 1302. Accordingly, as a result of this non-planar, "staggered" layout, the respective sizes of the first pixel 1301a, the second pixel 1301b and the third pixel 1301c may be increased and/or more pixels may be included on the detector array, such as previously described with respect to the examples of FIGS. 4 to 11. That is, although not illustrated, a reflective material may be disposed on at least some surfaces of one or more pixels (e.g., akin to 416 discussed above) to inhibit electrical charge (e.g., as opposed to light energy) from migrating from one pixel to another. The staggered arrangement may provide benefits with regard to the charge reflective material that are similar to the aforementioned benefits realized with regard to the light reflective material.

As used in this application, the terms "component," "module," "system," "interface," and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or." In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes," "having," "has," "with," or variants thereof are used, such terms are intended to be inclusive in a manner similar to the term "comprising."

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc., for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A detector array configured to detect radiation photons, the detector array comprising:
    a first pixel comprising:
        a first photodetector;
        a first scintillator overlying the first photodetector and configured to convert a first radiation photon into first light energy;
        an optical carrier intervening between the first scintillator and the first photodetector; and
        first reflective material beginning and ending adjacent a sidewall of the first scintillator; and
    a second pixel partially underlying the first pixel and comprising:
        a second photodetector;
        a second scintillator directly on the second photodetector and configured to convert a second radiation photon into second light energy; and
        second reflective material beginning and ending adjacent a sidewall of the second scintillator.

2. The detector array of claim 1, wherein the first reflective material at least partially overlies the second reflective material.

3. The detector array of claim 1, wherein the first reflective material at least partially overlies the second scintillator.

4. The detector array of claim 1, wherein the first scintillator has a first width and the first photodetector has a second width less than the first width.

5. The detector array of claim 1, wherein the second reflective material underlies the first scintillator.

6. The detector array of claim 1, further comprising a support structure disposed over a top surface of the second scintillator of the second pixel and under a bottom surface of the first scintillator of the first pixel.

7. The detector array of claim 6, wherein the support structure is disposed between the first scintillator and the optical carrier of the first pixel.

8. The detector array of claim 1, wherein the first scintillator has a first scintillator thickness and the second scintillator has a second scintillator thickness, the second scintillator thickness different than the first scintillator thickness.

9. The detector array of claim 1, wherein the first scintillator is configured to measure radiation photons having a first energy spectrum and the second scintillator is configured to measure radiation photons having a second energy spectrum different than the first energy spectrum.

10. The detector array of claim 1, wherein the second pixel comprises a filter and the first pixel does not comprise a filter.

11. The detector array of claim 1, wherein the first scintillator has a first composition and the second scintillator has a second composition different than the first composition.

12. The detector array of claim 1, wherein a width of first scintillator is greater than a width of the optical carrier.

13. The detector array of claim 1, further comprising a third pixel partially underlying the first pixel and comprising:
 a third photodetector;
 a third scintillator directly on the third photodetector and configured to convert a third radiation photon into third light energy; and
 third reflective material beginning and ending adjacent a sidewall of the third scintillator.

14. The detector array of claim 13, wherein the first pixel intervenes between the second pixel and the third pixel.

15. The detector array of claim 14, wherein the optical carrier of the first pixel extends from and between the second reflective material of the second pixel and the third reflective material of the third pixel.

16. A detector array configured to detect radiation photons, the detector array comprising:
 a first pixel, comprising:
  a first photodetector;
  an optical carrier over the first photodetector;
  a first scintillator over the optical carrier and configured to convert a first radiation photon into first light energy; and
  first reflective material that begins and ends adjacent a sidewall of the first scintillator; and
 a second pixel adjacent the first pixel and comprising:
  a second photodetector;
  a second scintillator directly contacting the second photodetector and configured to convert a second radiation photon into second light energy; and
  second reflective material that begins and ends adjacent a sidewall of the second scintillator; and
 a support structure disposed under the first scintillator of the first pixel and over the second scintillator of the second pixel.

17. The detector array of claim 16, wherein the first scintillator of the first pixel and the second scintillator of the second pixel each directly contact the support structure.

18. A detector array configured to detect radiation photons, the detector array comprising:
 a first pixel, comprising:
  a first photodetector;
  a first scintillator over the first photodetector and configured to convert a first radiation photon into first light energy;
  an optical carrier extending from and between the first scintillator and the first photodetector; and
  first reflective material beginning and ending adjacent a sidewall of the first scintillator; and
 a second pixel, comprising:
  a second photodetector;
  a second scintillator on the second photodetector and configured to convert a second radiation photon into second light energy; and
  second reflective material beginning and ending adjacent a sidewall of the second scintillator; and
 a support structure disposed under the first scintillator and over each of the optical carrier and the second scintillator.

19. The detector array of claim 18, wherein the first scintillator has a first composition and the second scintillator has a second composition different than the first composition.

20. The detector array of claim 18, wherein the first scintillator has a first scintillator thickness and the second scintillator has a second scintillator thickness, the second scintillator thickness different than the first scintillator thickness.

* * * * *